3,216,735
MOBILE FLUID CARRIER UNIT AND VEHICLE
ASSEMBLY THEREOF
Arne V. Larson, Leveret C. Russler, and Waldemar J. Meldahl, Clintonville, Wis., assignors to FWD Corporation, a corporation of Wisconsin
Filed May 26, 1958, Ser. No. 737,656
8 Claims. (Cl. 280—5)

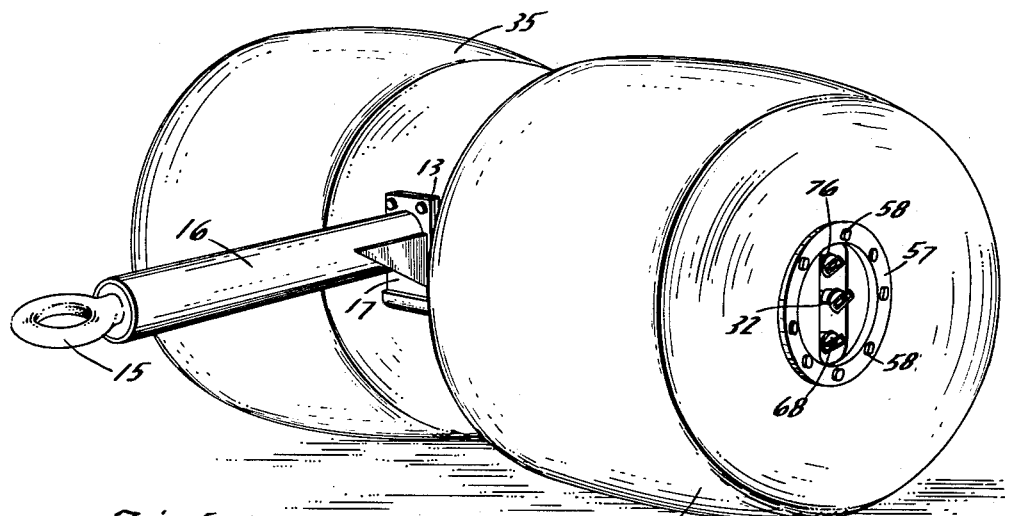
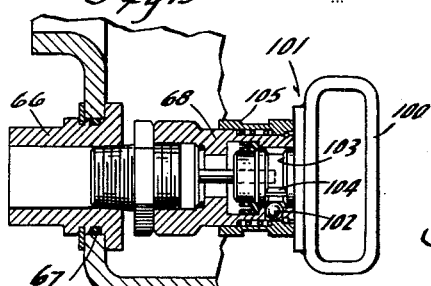
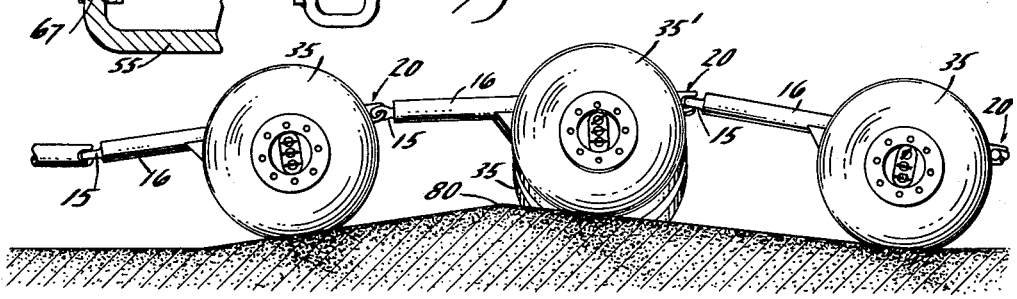

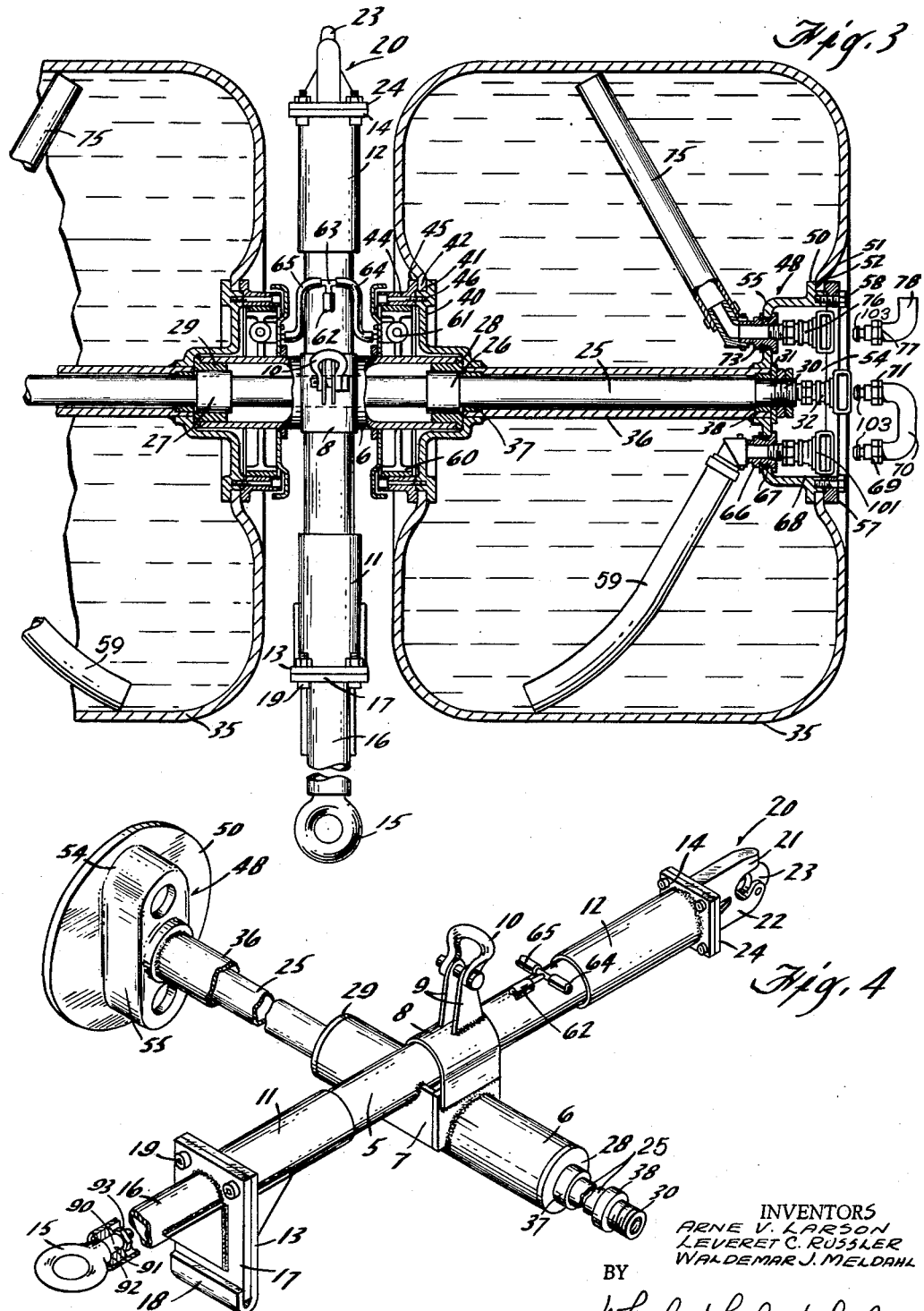

This invention relates to a mobile fluid carrier unit and vehicle assembly thereof.

The present device employs, as its basic unit, a sectional tow-bar link in cruciform connection with an axle between flexible walled rolling tanks mounted on the ends of the axle. There is no frame other than the tow-bar link, this being provided with complementary towing couplings at its opposite ends, whereby it may be connected with a tractor and with the similar tow-bar links of other units to provide a vehicle which constitutes a whole series of units, each of which carries its pay load entirely in a tank which also serves as a tire.

It becomes important in a device of the character described to provide brakes for the wheels of the individual units. Each of the mobile tank-wheels has a hub portion which includes a sleeve through which the axle extends and annuli at the ends of the sleeve spaced to support and clamp the rim flanges of the casing which serves as a tank. It is an important feature of the invention to provide a brake drum integral with that tire bead clamp which is closest to the point where the axle and the tow-bar link are in cruciform connection.

The tire bead of the flexible casing is quite rigid, and in order that it may be dismounted over the outer hub when the bead clamp of the outer hub is removed, while at the same time accommodating the pressure and withdrawal coupling fittings mounted on the hub, it is desired that the outer end disc of the hub have a recess in which the fittings are disposed for their protection, and which recess is integral with the disc but is non-circular, being elongated on one diameter of the hub and relatively narrow on another diameter to facilitate working the hub through the head of the casing when it becomes necessary to remove or replace the casing.

Desirably hoses are provided to provide access to the casing for insertion and withdrawal of contents. At least the withdrawal hoses are desirably swiveled to the hub so they can be manipulated to a position in which the inlet end of the hose lies at the bottom of the casing regardless of the position in which the casing comes to rest at the delivery point.

The invention contemplates that air which replaces the liquid contents withdrawn from the casing may be admitted under atmospheric pressure or under super-atmospheric pressure. In the latter case, it is immaterial whether an adjustable hose be provided for the air admission port, but in the former case it is desirable that the air admission hose also be swiveled so that its air delivery end can be adjusted to reach into the highest portion of the casing for the admission of atmospheric air into the air space at the top of the casing. For the purposes of this invention, the inlet and withdrawal fittings are both preferably mounted on the hub rather than the axle. However, when it is desired to unload both casings of a pair of casings from one particular side of the unit, the unloading of the casing on the far side of the unit may be effected through the tubular axle, a temporary cross coupling being provided between the withdrawal fitting on the far side of the unit and the far end of the axle.

The center pole or draw-bar link is desirably so made that it can be reduced in length so that its length does not exceed the diameter of the casings which lie at each side of it. This facilitates handling of the unit. A single unit may, for example, be carried on a truck, ship, airplane or other vehicle and dropped from a considerable height, the casings sustained the shock and the draw-bar being reduced to a length such that it will not sustain damage under these circumstances. To this end, the couplings at the opposite ends of the draw-bar are desirably made removable as a convenient means of shortening the draw-bar. Further to facilitate handling, a shackle or eye is provided substantially above the center of gravity of the unit to receive the hook of a hoist.

The complementary coupling members at the ends of the draw-bar link of each unit desirably include a ring on one end and a pintle or snaffle hook at the other to facilitate the connection of a number of units together in a train to be attached to a tractor of any sort to be pulled over the terrain. The connection between the ring and the hook is very flexible, allowing each unit individually to accommodate itself to the nature of the terrain, the engaged coupling elements being universally flexible to allow for torsional as well as pivotal movements between the units. This flexibility is increased by mounting the ring to swivel on the axis of the draw-bar link.

In the drawings:

FIG. 1 is a view in perspective of a complete unit embodying the invention.

FIG. 2 is a view in side elevation showing a number of coupled units, of which the one in the center is traversing an elevation which has raised one wheel higher than the other.

FIG. 3 is an enlarged fragmentary detail view in horizontal section transversely through one of the units.

FIG. 4 is a fragmentary detail view in perspective showing the cruciform frame and axle assembly, with portions of one of the hubs also illustrated.

FIG. 5 is a fragmentary detail view of a portion of a wheel broken away to show how the dust cover is used to turn the quick-disconnect couplings.

Each unit comprises as its only frame a tow-bar link 5 (see FIG. 4) having a transverse bearing sleeve 6 welded to it by means of the interconnecting box member 7. The strap 8 welded to the box member 7 has ears at 9 which support a clevis 10 with which a hoist may be engaged to lift the unit.

At the ends of the tow-bar link 5 are sleeves 11 and 12 respectively provided with end plates 13 and 14 to which the respective couplings are detachably connected. The coupling 15 comprises an eye mounted on a shank 90, which is rotatably mounted in a bore 91 in plug 92, and held from axial movement by nut 93. The plug is secured in a sleeve 16 welded to the plate 17. One margin of the plate is engaged in the channeled end portion 18 of plate 13 so that only two bolts 19 are required to connect the terminal sleeve 16 and eye 15 with the tow-bar link 5.

At the other end of the device there is a pintle or snaffle hook 20 having a pair of spaced jaws 21 and 22, one of which has a pivoted finger 23 for receiving and engaging the eye 15 of a comparable unit. The snaffle hook coupling 20 is mounted on a plate 24 bolted to the plate 14 to permit of its bodily removal when it is desired to shorten link 5. When both ends of the tow-bar link are removed, it is wholly within the tire radius, so that the device may be dropped from a truck or subjected to other shocks with little chance of damage.

The tubular axle 25 (FIG. 3 and FIG. 4) is provided with collars 26, 27 which are positioned within bushings 28, 29 flanged to engage the ends of the transverse sleeve 6. The axle is tubular and has each end threaded as shown at 30 in FIG. 3 to receive a lock nut engaged with a washer 31 which positions the hub on which the carrier casing is mounted. In the end of the tubular axle, there is desirably provided a quick-disconnect coupling 32 for reasons hereinafter to be explained.

The hub of each carrier casing 35 comprises a tube 36 counterbored to receive the bearing bushings 37, 38 at its respective ends, these bushings being rotatable on the axle 25. At the inside of each tire, the hub includes a rim flange 40 shouldered at 41 to receive the bead 42 of casing 35. It is an important feature of the present device that the brake drum 44 is integral with the annular bead clamp ring 45, the drum and clamp ring assembly being held to the rim flange 40 by means of bolts 46.

At the outside of each casing, the hub includes a rim flange 48. The rim flange proper comprises a circular flange 50 shouldered at 51 to provide a seat for the bead 52 of the casing. However, the face of this disc is recessed at 54 and the recess is formed by means of an elongated box-like structure 55 integral with the flange 50 and deep enough to receive the various quick-disconnect couplings. It will be observed from FIG. 4 that this box-like formation is elongated on one diameter of the hub, but is relatively narrow on the transverse diameter. This facilitates mounting and changing of the casing. The clamp ring 57 is bolted at 58 to the disc 50 to engage the casing bead in the usual way.

Cooperating with the brake drum 44 is a brake shoe structure 60 operated under fluid pressure by a cylinder 61 from a pressure line 62 having a T 63 from which flexible extensions 64, 65 lead to the brakes of the respective hubs. The brake structure is not illustrated in detail, since it is significant of the present invention only that the drum 44 be mounted as a part of the bead clamp ring 45.

Within each casing 35 there is at least one, and desirably two, hoses which are swiveled to the respective hubs. The discharge hose 59 is mounted on a swiveled fitting 66 having a seal at 67 so that the insert can turn in the box portion 55 of the rim flange 48 without leakage. At the end of the fitting is a quick-disconnect coupling at 68 to receive an external discharge hose similar to the complementary coupling and air hose shown at 77, 78, or to the complementary coupling 69 which, through hose 70 and coupling element 71, permits the hose 59 to be coupled, to the tubular axle shaft 25 in order that the contents of the carrier casing 35 which is shown at the right in FIG. 3, may be withdrawn through the other end of the axle shaft if desired.

A similar swiveled fitting 73 has connection with a hose 75 through which air can be admitted to the top of the carrier casing 35. It will be understood that FIG. 3 is a horizontal view of these parts, but regardless of the position in which the carrier casing comes to rest, the operator can swivel the respective fittings 66 and 73 to locate the inlet end of discharge hose 59 at the bottom and the air delivery end of hose 75 at the top of the casing.

Quick-disconnect couplings 32, 68 and 76 are standard couplings having a spring biased sleeve 105. Sleeve 105 in its normal position forces ball 102 radially inwardly in a hole in coupling 68 to engage groove 103 on the dust cap 100, preventing withdrawal of the dust cap. Upon moving sleeve 105 against the bias of the spring, the ball 102 is uncovered so that upon longitudinal outward movement of the dust cap 100, ball 102 is moved radially outwardly in its hole by the side of groove 103. The hole is so constructed that ball 102 cannot escape from either end of it. Complementary hose couplings 69, 71, and 77 are also provided with grooves 103, and are standard commercial couplings. Groove 103 in dust cap 100 is modified by the addition of at least one stop 104 filling the groove. Stop 104 cannot pass ball 102 as dust cap 100 is turned, since sleeve 105 blocks radial movement of the ball. Thus ball 102 forces the quick-disconnect coupling 68 or 76 to turn. The quick-disconnect couplings are rigidly secured to swivel fittings 66 and 73, and hoses 59 and 75 are rigidly connected to their respective swivels, so that by turning dust caps 100, the hoses may be adjusted to the proper position. If desired, complementary couplings 69, 71, and 77 may be provided with stops 104 in grooves 103, but this is not essential since the position of hoses 59 and 75 may be adjusted before removing the dust caps.

Swivel 73 has a quick-disconnect coupling element at 76 with which a complementary coupling element 77 is engageable to admit either atmospheric air or air under pressure through the hose 78. Flow of the contents of the carrier casing will be accelerated if a light pressure on the order of five pounds to the square inch is applied through hose 78 instead of relying on atmospheric pressure. There is a further advantage in that when discharge of the contents has been completed, the carrier casing is left with sufficient inflation to support readily the weight of the tow-bar link which constitutes its frame, and the axle.

With the draw-bar link extensions in place and the respective couplings 15 and 20 connected between successive units as shown in FIG. 2, the carrier casings are spaced sufficiently to provide great flexibility of maneuvering. Quite a short turn can be made, accommodated by the universal pivoting of the coupling elements 15 and 20 with respect to each other. In addition, either of the casings of a particular unit will surmount an irregularity in the terrain such as that shown at 80 in FIG. 2, which is being surmounted by a casing 35' while the corresponding casing 35 remains at a lower level.

We claim:
1. A transport unit comprising a frame, said frame consisting only of a central frame element and relatively light tubular transverse axle means, said transport unit further comprising relatively light hubs mounted on the axle means at both sides of the central frame element, and flexible-walled carrier casings on respective hubs, the central frame element being disposed between the carrier casings and comprising a draw-bar link section having complementary couplings at its respective ends for attachment to the like sections of a similar unit, the said coupling elements being mounted on separable extensions with which said link section is provided and which, when separated from the link section, leave the link section shorter than the diameter of the respective carrier casings.

2. A transport unit comprising a frame, said frame consisting only of a central frame element and relatively light tubular transverse axle means, said transport unit further comprising relatively light hubs mounted on the axle means at both sides of the central frame element, and flexible-walled carrier casings on respective hubs, the central frame element being disposed between the carrier casings, the respective hubs being provided with access fittings affording communication with the interior of the respective casings, said fittings being provided with flexible passage means extending to points adjacent the periphery of said carrier casings, and means adapting said access fittings for angular adjustment with respect to said hubs.

3. The device of claim 2 in which the outer ends of of the respective hubs have recesses in which the access fittings are disposed, said fittings having quick-connectible couplings to receive loading and unloading couplings.

4. In a vehicle of the type provided with flexible-walled transport carrier tire casings, the combination with two such casings as laterally spaced and substantially co-axial, each being provided with marginal beads, of a draw-bar link section extending longitudinally between said casings, a transverse tubular axle connected with said link section and projecting axially through both said casings, fittings at each end of said axle adapted for connection with a hose line, hubs rotatably mounted on the axle and having inner and outer rim flanges with casing bead engaging portions, said hubs being further provided with fittings adapted to be connected with a hose and opening into the space enclosed by the carrier casing and the hub, and clamp rings detachably connected with respective rim flanges, and clamping the casing beads to the rim flanges.

5. In a vehicle of the type provided with transport carrier tire casings, the combination with two such casings which are laterally spaced and substantially coaxial, each being provided with marginal beads, of a draw-bar link section extending between said casings, a transverse axle connected with said link section and projecting axially through the casings, hubs rotatably mounted on the axle and having inner and outer rim flanges with casing bead engaging portions, and clamp rings detachably connected with respective rim flanges, and clamping the casing beads to the rim flanges, one rim flange of each such hub being provided with a swiveled coupling member, and a hose connected with the swivel member and extending radially within the associated casing, the swivel member being provided with a coupling fitting communicating with the hose.

6. The combination set forth in claim 5 in which the respective rim flanges provided with said swivel member have box recesses offset within the casing, and having inner wall portions upon which the swivel member is mounted to lie within said recesses.

7. In a vehicle of the type using a transport casing, a wheel which comprises a hub having a tubular portion provided with rim flanges at its end, each flange having an annular clamping seat, a flexible walled casing having beads engaged with the respective seats, clamping rings bolted to the respective rim flanges in clamping engagement with said beads to hold said beads to said seats, one of said rim flanges having a wall portion offset inwardly, and elongated diametrically of the rim flange to form an outwardly opening box-like recess narrow in one dimension and elongated in the other, and at least one access fitting opening into the interior of the casing and mounted in the offset wall portion to be housed within the recess.

8. The device of claim 7, said access fitting comprising a member swiveled in the wall, a hose connected to the member and disposed within the casing, and having a portion extending radially outwardly therein, and a coupling element mounted on said member.

References Cited by the Examiner
UNITED STATES PATENTS

| | | | |
|---|---|---|---|
| 1,125,227 | 1/15 | Weaver | 280—63 X |
| 1,989,573 | 1/35 | VonLoutzkoy. | |
| 2,335,297 | 11/43 | Millhouse et al. | 280—476 |
| 2,379,265 | 6/45 | Whitmer | 280—476 |
| 2,548,190 | 4/51 | Arpin | 280—5 |
| 2,576,736 | 11/51 | Watkins | 152—397 |
| 2,723,130 | 11/55 | Andrews | 280—476 |
| 2,824,592 | 2/58 | Neisler et al. | 152—9 |
| 2,952,468 | 9/60 | Albee | 280—5 |
| 2,974,970 | 3/61 | Tuttle et al. | 280—5 |

FOREIGN PATENTS

| | | |
|---|---|---|
| 101,076 | 5/37 | Australia. |
| 573,726 | 12/45 | Great Britain. |

OTHER REFERENCES

"Design News;" Feb. 3, 1958; page 4.

A. HARRY LEVY, *Primary Examiner.*

WILLIAM J. KANOF, PHILIP ARNOLD, *Examiners.*